US006064018A

United States Patent [19]

Seymour et al.

[11] Patent Number: 6,064,018

[45] Date of Patent: May 16, 2000

[54] MOLDED CASE CIRCUIT BREAKER MOLDED POLE ASSEMBLY

[75] Inventors: Raymond K. Seymour, Plainville; Thomas F. Papallo, Jr., Farmington; William H. Calder, Plainville, all of Conn.

[73] Assignee: General Electric Company, Schenectady, N.Y.

[21] Appl. No.: 09/177,999

[22] Filed: Oct. 23, 1998

[51] Int. Cl.$^7$ ........ H02B 1/26

[52] U.S. Cl. ........ 200/293; 200/307; 218/155

[58] Field of Search ........ 200/17 R, 293, 200/294, 303, 307, 295–297; 218/147–149, 9, 15, 152, 153, 155; 335/8–10; 361/626–628, 634, 636, 644, 652, 673

[56] References Cited

U.S. PATENT DOCUMENTS

| | | | |
|---|---|---|---|
| 2,824,191 | 2/1958 | Christensen | 200/307 X |
| 3,463,967 | 8/1969 | Klein | 361/353 |
| 4,157,582 | 6/1979 | Myers | 361/353 |
| 4,203,146 | 5/1980 | Sabatella et al. | 361/361 |
| 4,644,308 | 2/1987 | Guery et al. . | |
| 4,970,482 | 11/1990 | Jacobs et al. . | |
| 5,272,592 | 12/1993 | Harris et al. | 361/637 |
| 5,298,874 | 3/1994 | Morel et al. . | |
| 5,319,166 | 6/1994 | Arnold et al. . | |
| 5,361,052 | 11/1994 | Ferullo et al. . | |
| 5,479,143 | 12/1995 | Payet-Burin . | |
| 5,607,047 | 3/1997 | Leet et al. . | |
| 5,640,294 | 6/1997 | Caggiano et al. | 361/637 |
| 5,761,026 | 6/1998 | Robinson et al. | 361/627 |

*Primary Examiner*—Renee S. Luebke

*Attorney, Agent, or Firm*—Cantor Colburn LLP; Carl B. Horton

[57] ABSTRACT

A molded case circuit breaker base is configured to receive pole modules that include the circuit breaker components for mutipole operation. The base is configured to receive the bottom edges of the module enclosures in press-fit relation. A complementary molded case circuit breaker cover attaches to the top of the modules to complete the multipole circuit breaker enclosure.

9 Claims, 3 Drawing Sheets

MOLDED CASE CIRCUIT BREAKER MOLDED POLE ASSEMBLY

BACKGROUND OF THE INVENTION

The advent of US circuit breaker manufacturers into the world market requires a larger number of poles when such circuit breakers are used in industrial applications.

Typical US electrical distribution systems provide 3 pole service compared to 4 pole service in some European and Asian countries where there is a need to switch the neutral conductor. Since the additional poles often require expensive molding operations to provide increased space, the provision of 4 or more pole industrial rated circuit breakers over a wide range of circuit breaker ampere ratings could increase the cost of such breakers to manufacture and sell.

An early approach to providing increased circuit breaker poles to existing 3 pole circuit breakers is found in U.S. Pat. No. 4,644,308 entitled "Variable Composition Switching Device Realizable by the Assembly of Modular Elements".

Another way to provide increased circuit breaker poles to existing 3 pole circuit breaker designs is found in U.S. Pat. No. 5,298,874 entitled "Range of Molded Case Low Voltage Circuit Breakers".

A further approach is described within U.S. Pat. No. 5,479,143 entitled "Multipole Circuit Breaker with Modular Assembly" wherein the individual circuit breaker pole components are in a modular configuration.

A state-of-the-art circuit breaker employing modular pole units for low voltage circuit breakers is found in U.S. Pat. No. 5,607,047 entitled "Circuit Breaker Housing".

FIG. 1 shows a three pole industrial-rated molded case circuit breaker comprising three separate poles for connecting with an exterior electric distribution circuit having three phase A–C. This industrial rated circuit breaker is disclosed in U.S. Pat. No. 5,361,052 entitled "Industrial-Rated Circuit Breaker Having Universal Application". The three pole industrial-rated molded case circuit breaker 100 comprises a plastic base 111 to which a plastic cover 112 is attached. The cover includes a handle aperture 113 through which an operating handle 114 extends. The operating handle interacts with the circuit breaker operating mechanism that controls the ON/OFF status of the circuit breaker contacts (not shown) in the manner described within U.S. Pat. No. 5,361,052. Each of the three separate poles of the circuit breaker connect with a separate phase of the exterior electric distribution circuit via load straps 109A–109C. Corresponding line straps (not shown) that connect with associated electrical equipment are located at the opposite end of the circuit breaker case. When more than three poles are required, it is common to mold larger circuit breaker having four of more poles integrally-formed therein.

It would be economically advantageous to have a single circuit breaker modular design for high ampere-rated circuit breakers without requiring separated molded plastic enclosures for each multipole circuit breakers over a wide range of ampere ratings. The modular approach makes the best use of a base unit supporting individual modules for low equipment cost to produce providing a diversity of products in 3, 4 or more pole combinations with a few number of unique components.

One purpose of the invention is to provided a wide range of multipole circuit breakers over a wide range of ampere ratings based on a common platform that accepts any number of modular pole units to accommodate up to 4 or more pole circuit breaker applications.

SUMMARY OF THE INVENTION

A molded case circuit breaker base is configured to receive a plurality of pole modules that include the circuit breaker components for multipole operation. The top surface of the base includes rails configured to receive tracks formed on the bottom edges of the module enclosures in press-fit relation. A complimentary molded case circuit breaker cover attaches to the top of the modules to complete the multipole circuit breaker enclosure.

DESCRIPTION OF THE PREFERRED EMBODIMENT

Figure 1:
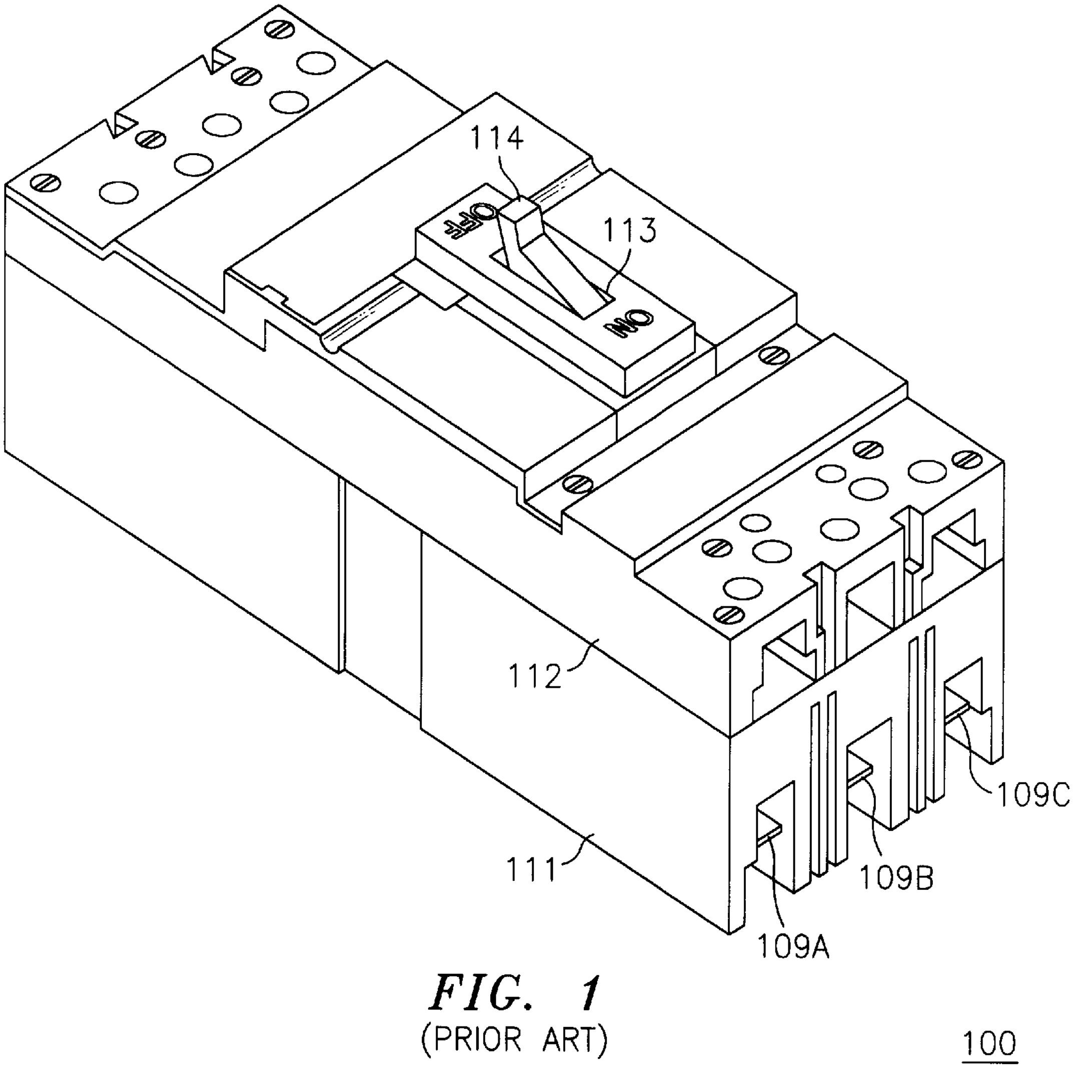
FIG. 1 (PRIOR ART)
FIG. 1 is a top perspective view of an industrial-rated 3-pole circuit breaker according to the Prior Art.
Figure 2:
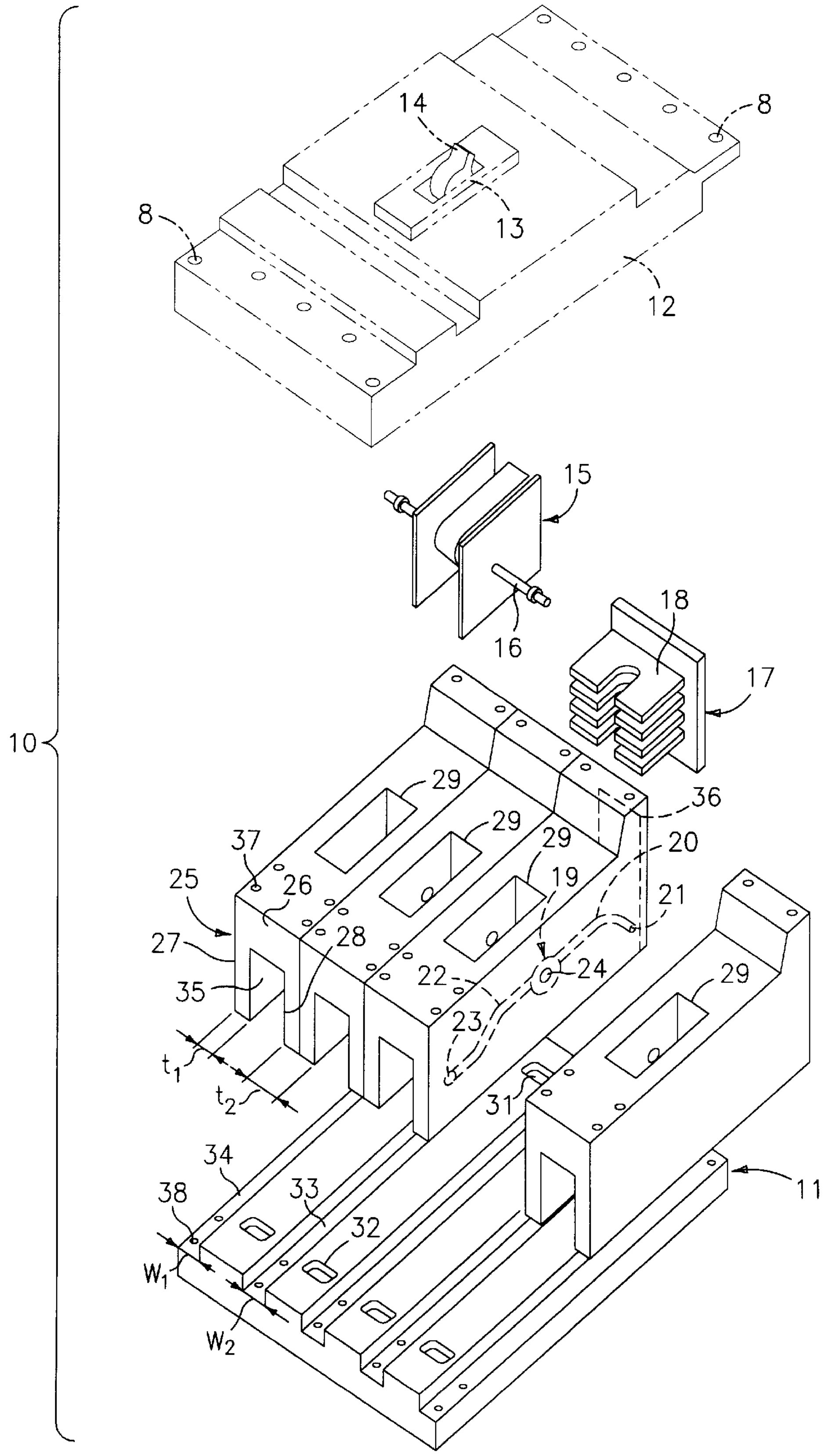
FIG. 2 is a top perspective view of an industrial-rated multipole circuit breaker according to the invention, with the pole components depicted in isometric projection with the circuit breaker base.

It has been determined that multipole circuit breakers can be assembled in the modular arrangement depicted in FIG. 2. In this arrangement, the base 11 and cover 12 for the multipole circuit breaker 10 are configured to fit one or more modular, U-shaped cases 25. The cases 25 include a top wall 26 and a pair of opposing sidewalls 27, 28 with a front opening 35 at one end for receiving the load straps (not shown) connecting with load strap recess 32 and a rear opening 36 at the opposite end for receiving the line straps (not shown) connecting with the line strap recess 31. The rear opening also receives the arc chute 17 that includes a plurality of arc plates 18. The arc chute is described in greater detail within U.S. Pat. No. 4,970,482 entitled "Current Limiting Circuit Breaker Compact Arc Chute Configuration". Each case 25 includes a movable contact assembly 19 with a moveable contact arm 20 that includes the movable contact 21 at one end and is connected with a rotor 24 at the opposite end thereof. The movable contact arm connects with the fixed straps (not shown) by attachment to the end 23 of a braid conductor 22. Similar to the manner described in U.S. Pat. No. 5,319,166 entitled "Molded Case Circuit Breaker Modular Contact Arm Arrangement", the operating handle 14 extends through the aperture 13 in the cover 12 and engages the operating mechanism 15 disposed within one of the U-shaped cases 25. The operating handle 14 engages the operating mechanism 15 through an opening 29 of the case 25. A crossbar 16 passes through apertures in the opposing sidewalls 27, 28 of the cases 25 to interconnect the operating mechanism 15 with each of the movable contact arm assemblies 19 to insure that the movable contact arms 20 operate in unison when the operating mechanism is articulated.

Attachment between the individual cases 25 and the base 11 is made by means of the press-fit relation between the rails formed on the bottom of the sidewalls 27, 28 and the inner and outer tracks or slots 33, 34 formed within the top surface of the base 11. To provide the press-fit relation, the thickness $t_1$ of the individual sidewalls 27, is configured relative to the width $w_1$ of the outer slots 34 and the thickness $t_2$ of pairs of sidewalls 27, 28 is configured relative to the width $w_2$ of the inner slots 33, accordingly. The cover 12 is attached to the cases 25 and the base 11 by means of fasteners 40 (see FIG. 3) extending through the apertures 8, 37 and 38 formed in the cover, cases and base respectively.

Figure 3:
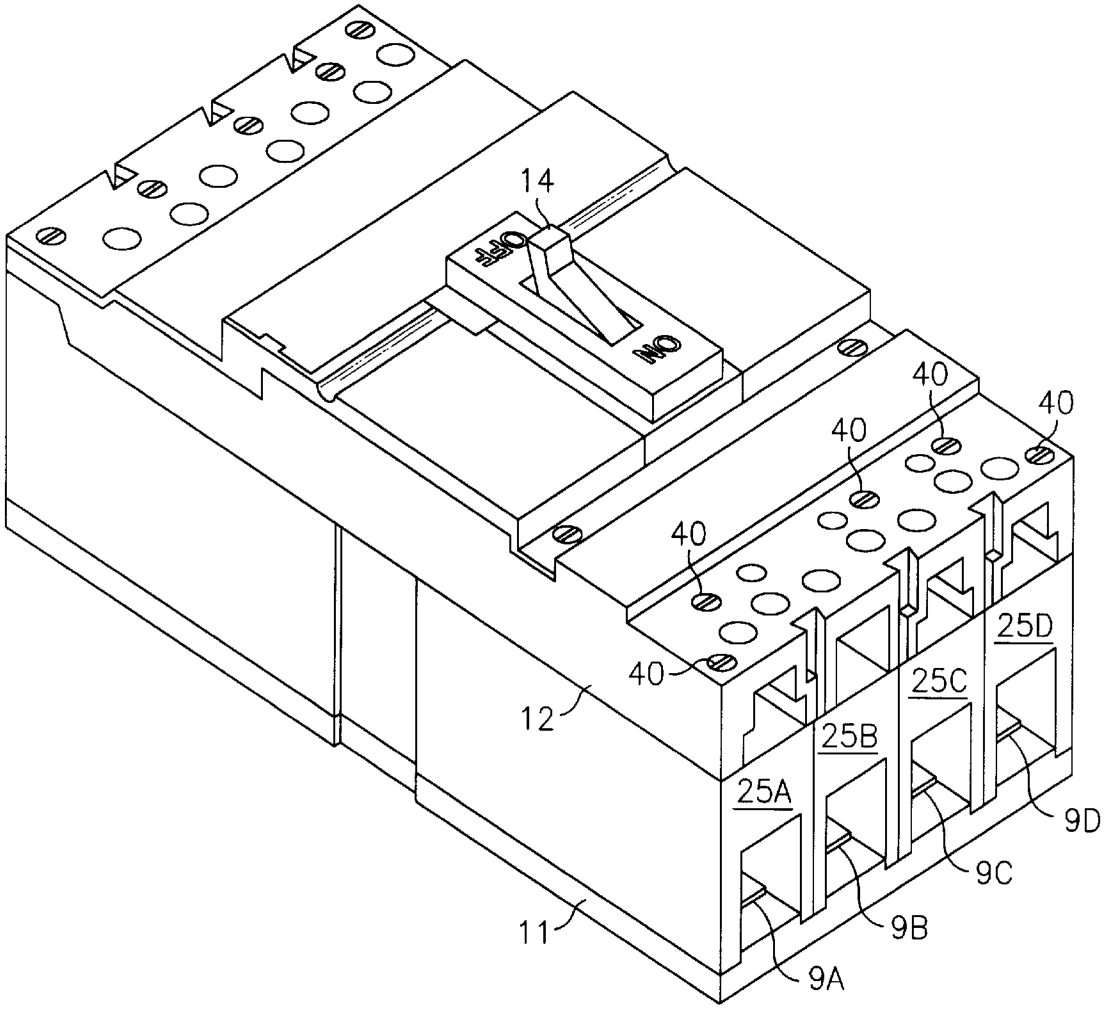
FIG. 3 is a top perspective view of the industrial-rated multipole circuit breaker of FIG. 2 in complete assembly.

The assembled four pole circuit breaker 10 is shown in FIG. 3 with the cover 12 attached to the top of the individual pole units contained within individual cases 25A–D, which are attached to the base 11, at the bottom thereof. The individual load straps 9A–9D are arranged for connection with the individual A–C phases of the associated electrical distribution circuit. The operating handle 14 is arranged for manually turning all the phases ON and OFF simultaneously.

Although four individual poles are shown in FIGS. 2 and 3, as many poles as required can be used within the teachings of the invention by configuring the cover and base to accept the required individual phases.

What is claimed is:

1. A multipole circuit breaker comprising:

a base of electrically insulative plastic material, said base forming a bottom portion of a circuit breaker;

a cover of electrically insulative plastic material, said cover forming a top portion of said circuit breaker;

a first U-shaped case of insulative plastic material intermediate said cover and said base, said first U-shaped case having a first top wall and first and second sidewalls depending from said first top wall, said first top wall and said first and second sidewalls defining a first cavity for containing a first movable contact arm, said first movable contact arm having a first movable contact arranged at one end thereof, said first movable contact for electrically connecting to a first phase of a multiphase electrical distribution circuit, a second U-shaped case of insulative plastic material intermediate said cover and said base, said second U-shaped case having a second top wall and third and fourth sidewalls depending from said second top wall, said second top wall and third and fourth sidewalls defining a second cavity for containing a second movable contact arm, said second movable contact arm having a second movable contact arranged at one end thereof, said second movable contact for electrically connecting to a second phase of said multiphase electrical distribution circuit; and an operating mechanism connecting between said first and second movable contact arms for causing said first and second movable contact arms to rotate in unison.

2. The multipole circuit breaker of claim 1 wherein said base includes first, second and third grooves disposed in a top surface thereof, said first groove accepting a first free end of said first sidewall, said second groove accepting a second free end of said second sidewall and a third free end of said third sidewall, and said third groove accepting a fourth free end of said fourth sidewall.

3. The multipole circuit breaker of claim 1 wherein said first case further includes an arc chute proximate said first movable contact.

4. The multipole circuit breaker of claim 2 wherein said free ends of said sidewalls are received within said grooves in press-fit relation.

5. The multipole circuit breaker of claim 1 wherein said base includes a load strap recess formed therein at one end and a line strap recess formed on an opposite end thereof.

6. The multipole circuit breaker of claim 1 further including:

a third U-shaped case of insulative plastic material intermediate said cover and said base, said third U-shaped case having a third ton wall and fifth and sixth sidewalls depending from said third top wall, said third top wall and fifth and sixth sidewalls defining a third cavity for containing a third movable contact arm, said third movable contact arm having a third movable contact arranged at one end thereof, said third movable contact for electrically connecting to a third phase of said multiphase electrical distribution circuit.

7. The multipole circuit breaker of claim 6 further including:

a fourth U-shaped case of insulative plastic material intermediate said cover and said base, said fourth U-shaped case having a fourth top wall and seventh and eighth sidewalls depending from said fourth top wall, said fourth top wall and seventh and eighth sidewalls defining a fourth cavity for containing a fourth movable contact arm, said fourth movable contact arm having a fourth movable contact arranged at one end thereof, said fourth movable contact for electrically connecting to a fourth phase of said multiphase electrical distribution circuit.

8. The multipole circuit breaker of claim 1 wherein said cover, said base and said first and second cases each include openings for passage of a fastener for holding said cover to said first and second cases, and said first and second cases to said base.

9. The multipole circuit breaker of claim 1 further including:

a circuit breaker operating handle extending through an aperture in said cover and interacting with said operating mechanism for manually controlling said first and second movable contact arms.

* * * * *

UNITED STATES PATENT AND TRADEMARK OFFICE

CERTIFICATE OF CORRECTION

PATENT NO. : 6,064,018 
DATED : May 16, 2000
INVENTOR(S) : Richard Seymour et al.

It is certified that error appears in the above-identified patent and that said Letters Patent is hereby corrected as shown below:

Column 2,
Line 44, after "the" delete "fixed" and insert therefor -- load --.

Column 4,
Line 16, after "third" delete "ton" and insert therefor -- top --.

Signed and Sealed this

Thirty-first Day of December, 2002

JAMES E. ROGAN
*Director of the United States Patent and Trademark Office*